United States Patent Office 3,420,602
Patented Jan. 7, 1969

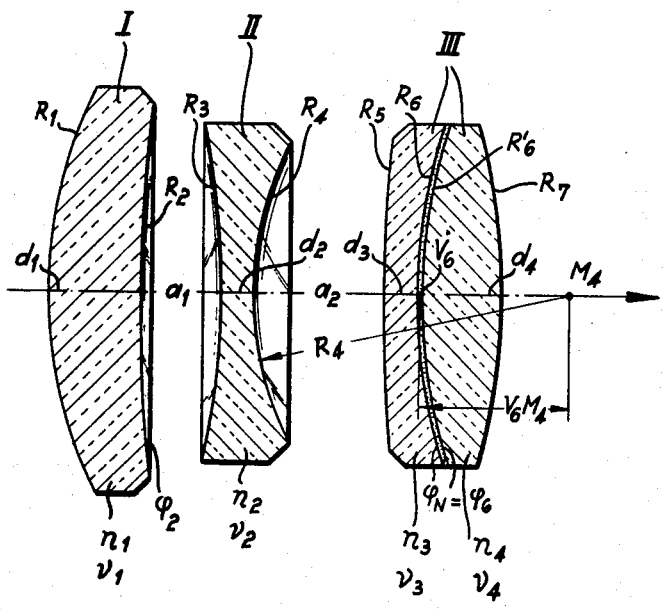

3,420,602
TRIPLET WITH ONE CEMENTED COMPONENT
Joachim Eggert, Ernst Tronnier, and Paul Schuhmann, Braunschweig, Germany, assignors to Voigtländer, A.G., Braunschweig, Germany, a corporation of Germany
Filed Mar. 22, 1965, Ser. No. 441,727
Claims priority, application Germany, Mar. 23, 1964, V 25,668
U.S. Cl. 350—227  10 Claims
Int. Cl. G02b 9/14

ABSTRACT OF THE DISCLOSURE

A photographic objective in the form of a triplet. The objective includes from front to rear a converging front lens, an intermediate non-symmetrical diverging lens, and a converging doublet. The objective may operate with an aperture of approximately 1:2.8 and has a focal length approximately equal to the diagonal of the useful image format, while the included angle of the objective for distant objects is somewhat greater than 53°. The objective is corrected for astigmatism, curvature of field, coma, and distortion to such an extent that even with the fully open aperture a high quality image is produced. Because of the increased included angle of the objective, as compared to conventional objectives, the objective has a focal length shorter than conventional objectives so that the size of a camera carrying the objective of the invention is considerably shortened along the optical axis.

---

The present invention relates to photographic objectives.

In particular, the present invention relates to an objective in the form of a triplet having one cemented component.

Astigmats of this type are well known. The rear lens of the triplet is in the form of a doublet composed of a pair of lenses which can have their adjoining surfaces cemented together, and according to one known construction these adjoining surfaces have a rearwardly directed convex curvature so that their concave curvature is directed forwardly away from the image. This known construction is corrected primarily so as to provide a substantial reduction in astigmatic adjustment differences of the lateral or outer portions of the curvature of the field, but this converging cemented surface at the adjoining lens surfaces of the rear doublet at the same time also influences in an undesirable manner the correction for spherical operation since this latter aberration is strongly undercorrected. This resulting defect in the form of a lack of a suitable correction for spherical aberrations is usually taken into account by the lens designer with other elements of the system which compensate for the spherical aberration to a very large extent, but this compensation for spherical aberration operates effectively only in the central image region.

As a result of the above-described curvature at the adjoining surfaces of the lenses of the rear doublet of the known structure, results in aperture errors not only at the central region of the image but also the quality of the image is particularly influenced at the edge portions of the image by the imaging resulting from the outer light rays of the bundle of light rays which pass through the objective to provide the image. Thus, the known objectives of the above type unavoidably provide at the outer regions of the viewing field a considerable drop in image sharpness, which results primarily from the fact that the spherical aberration has not been corrected sufficiently so that the wide open coma bundle has a relatively large angle of inclination with respect to the optical axis, undesirably influencing the imaging of the outer regions of the viewing field at included angles which are greater than approximately 46°, so that with these known objectives an included angle of greater than 46° is not possible.

With known structures of the above type, the action of the converging cemented adjoining lens surfaces of the rear doublet on the uncorrected errors, particularly the coma bundle errors referred to above, is much greater than the corresponding action of the rear concave surface of the intermediate diverging biconcave negative lens, with reference to the spherical overcorrection provided in the entire range of aberrations. This latter basic defect of the known objectives has not been capable of correction by increasing the overcorrection action referred to above (for example by increasing the refractive power of the rear surface of the intermediate negative lens), because with such a correction there would necessarily be included at the same time an increase in the higher order aberrations.

It is accordingly a primary object of the present invention to provide an objective of the above type which will avoid the drawbacks of the known constructions.

In particular, it is an object of the invention to avoid the drawbacks of the known constructions by providing, in contrast to the many earlier efforts to avoid these drawbacks, a new distribution of the internal refractive powers of the objective.

Thus, it is an object of the invention to provide an objective of the above type which, while fully maintaining an effective reduction of astigmatic adjusting differences throughout an included angle of more than 50°, is also capable of reducing coma errors even for relatively large inclinations of the light ray bundle at the outer regions of the viewing field to such an extent that a uniformly high degree of image sharpness is achieved throughout the image area of the objective of the present invention even at the widest aperture.

Thus, it is an object of the present invention to provide an objective of the above type which, while increasing the useful included angle at the same time reduces the residual coma error over the entire enlarged included angle while still maintaining the great light intensity which can be achieved by providing for the objective a relative aperture of 1:2.8.

Thus, the invention relates to an objective of relatively wide aperture which is spherically and chromatically corrected and which also is corrected for astigmatism, for curvature of field, for coma, and for distortion, this objective being a triplet having one cemented component and having a relative aperture which is greater than 1:3.5, and in addition the objective of the invention has an astigmatically flattened image field provided with an included angle of greater than 50°.

This objective of the invention includes from front to rear in the direction in which light enters from the side of the longer conjugate, a converging front lens of meniscus configuration and an intermediate non-symmetrical diverging lens following and spaced from the front lens and situated in the region of the diaphragm of the objective, both of these latter lenses including between themselevs an air space which defines a diverging air lens. The intermediate lens is followed by a converging doublet which forms the rear component and which is made up of a pair of lenses having opposite signs of power and cemented together at their adjoining surfaces, these cemented adjoining inner surfaces of the lenses of the doublet acting in a converging manner and having a concave configuration directed rearwardly toward the image plane.

The objective of the present invention is particularly suited for a practical embodiment which has an aperture of approximately 1:2.8 and a focal length which is approximately equal to the diagonal of the useful image format, the included angle of the objective of the invention for distant objects being somewhat greater than 53°. This anastigmat of the present invention fulfills all of the requirements which the practicing photographer could have with respect to an objective which is desired to provide at intermediate apertures images of sufficient sharpness to achieve high quality photographs, and this result is achieved without resorting to lens configurations which are difficult to manufacture, and also without necessitating extremely close manufacturing tolerances. Thus, with the objective of the invention it is possible to provide an astigmat of the above type having a greatly increased imaging capability as compared to known structures, while still maintaining the full sharpness of the image and the widest aperture, whereas with previously known structures at corresponding apertures it was only possible to use objectives of the above types for smaller included angles of up to approximately 46°.

The objective of the present invention is particularly suitable for relatively small still cameras which are adapted to carry light-responsive structure capable of automatically setting the cameras to make proper exposures according to the lighting conditions. As a result of the increased included angle of the objective of the invention, as compared to known objectives of the same type as the present invention, it is possible to provide the objective of the invention with a shorter focal length than conventional objectives of the same type, so that as a result it is possible with the objective of the invention to achieve a remarkable shortening in the size of the camera along the optical axis of the objective.

Furthermore, because of the increase in the extent to which the corrections are maintained at fully open aperture, a completely uniform high quality imaging capability is assured irrespective of the particular opening which is automatically set by the light-responsive structure of an automatic or semi-automatic camera of the above type. This very important advance is achieved by constructing the objective of the inventon in a manner described below.

An objective according to the present invention is schematically illustrated in the drawing where the significance of various symbols used in the description which follows is indicated. All of the symbols which appear in the drawing are used in the specific examples which follow and are also used in the claims. Thus, it will be seen that the numerical identification of the various radii of curvature R, the thicknesses $d$ of the several lenses, and the distances $a$ between the lenses increase from left to right, as viewed in the drawing, which is to say from the front toward the rear of the lens in the direction of the arrow shown in the drawing extended along the principal or optical axis, this direction being the direction in which light enters into the objective from the side of the longer conjugate toward the side of the shorter conjugate. Moreover, it will be seen that the glass constants are identified by numerals which increase in the same direction. These glass constants include the refractive index $n_d$, taken with respect to the yellow d-line of the helium spectrum, and the color dispersion is indicated by the Abbe numbers or Nu-values $\nu_d$.

Thus, referring to the drawing, it will be seen that the front lens I has front and rear surfaces of radii of curvature $R_1$, $R_2$, respectively, while the intermediate lens II is spaced rearwardly from the front lens I by a distance along the principal axis of $a_1$, the front lens I having a thickness of $d_1$ and the intermediate lens II having a thickness of $d_2$, this intermediate lens having front and rear surfaces of the radii of curvature $R_3$, $R_4$ indicated in the drawing. Situated to the rear of the intermediate lens II, which is situated in the region of the unillustrated diaphragm of the objective, is the rear doublet III composed of the pair of illustrated lenses, the front lens of the doublet having the thickness $d_3$ and the rear lens of the doublet having the thickness of $d_4$, and the adjoining surfaces of the lenses, which are cemented together, having a radius of curvature $R_6$, although in the drawing a radius of curvature $R'_6$ is indicated for the front surface of the rear lens of the doublet, but it is to be understood that these radii of curvature of the adjoining surfaces of the doublet lenses are identical. The doublet III has a front surface whose radius of curvature is $R_5$ and a rear surface whose radius of curvature is $R_7$. The various designations of the glass constants for the several lenses are also indicated, and in addition the refractive indexes of the rear surface of the front lens I and also of the inner surfaces of the doublet III are symbolically indicated in the drawing.

It will also be seen from the drawing that the radius of curvature $R_4$ has its center $M_4$ situated at a distance $V_6M_4$ from the vertex $V_6$ of the adjoining lens surface of the doublet III.

While the objective of the invention is referred to as a triplet having one cemented component, it is to be understood that this designation is for the purpose of classification only and that actually the lenses of the doublet III do not have to be cemented to each other but in the known way can include between themselves an extremely narrow air space and thus the adjoining lens surfaces can have a slight difference in their radii of curvature, so that for this reason the radii $R_6$ and $R'_6$ are indicated in the drawing and are referred to in the examples below. The vertex $V_6$, however, is the equivalent of the common vertex of the adjoining surfaces of the lenses of the doublet III.

The object of the present invention fulfills the following general requirements:

(a) The front lens I is a positive lens of meniscus-type shaped configuration so that its refractive power $\varphi_I$ is positive, and its Gardner's shape factor $\sigma_I$ is greater than $+1.0$.

(b) The biconcave non-symmetrical negative intermediate lens II has a refractive power $\varphi_{II}$ and is negative. Also, the Gardner's shape factor $\sigma_{II}$ is smaller than the value $-0.575$ but greater than $-0.175$, so that $-0.175 < \sigma_{II} < -0.575$.

(c) The distance $a_2$ along the principal axis between the intermediate lens II and the rear doublet III is greater than the distance $a_1$ between the intermediate lens II and the front lens I, so as to provide sufficient space between the components II and III, and thus in accordance with this requirement $a_2 > a_1$.

(d) The sum of the refractive powers of both of the lenses of the doublet III is positive. The radius of curvature $R_4$ of the rear surface of the intermediate lens II is smaller than the radius of curvature $R_1$ of the front surface of the front lens I and also smaller than the radius of the curvature $R_6$ of the adjoining lens surfaces of the doublet III, so that $R_1 > R_4 < R_6$.

The objective of the present invention, in addition to fulfilling the above general requirements, fulfills the following specific requirements:

($A_1$) The focal length ($f_I^*$) of the converging front lens is the reciprocal of the sum of the refractive powers of its surfaces ($\varphi_1 + \varphi_2$), and this focal length ($f_I^*$) has such a value that the ratio ($f_I^{**}$) of the focal length ($f_I^*$) to the diameter (P) of the fully open entrance pupil of the entire objective is between the values $+1.625$ and $+1.875$, so that $+1.625 < f_I^{**} < +1.875$.

($A_2$) The corresponding ratio ($f_{II}^{}$) of the diverging intermediate lens II is between the values $-1.085$ and $-1.225$, so that $-1.085 < f_{II}^{} < -1.225$.

($A_3$) The corresponding ratio ($f_{III}^{}$) of the doublet III is between the values $+1.625$ and $+2.055$ so that $+1.625 < f_{III}^{} < +2.055$.

($B_1$) The value of the negative refractive power ($\varphi_2$) of the rear surface of the front lens I is between 6% and 30% of the equivalent refractive power ($\Phi$) of the entire objective, so that $$-0.060\Phi < \varphi_2 < -0.300\Phi$$

(B$_2$) The value of the positive refractive power ($\varphi_N$) of the adjoining surfaces of the lenses of the doublet III is between 13% and 27.5% of the equivalent refractive power ($\Phi$) of the entire objective, so that $$+0.130\Phi < \varphi_N < +0.275\Phi$$

(C$_1$) The value of the sum of the radius of curvature R$_1$ of the front surface of the front lens I and the radius of curvature R$_4$ of the rear surface of the intermediate lens II is between 72.5% and 92.5% of the equivalent focal length ($f$) of the entire objective so that $$0.725f < (R_1 + R_4) < 0.925f$$

(C$_2$) The value of the quotient resulting from dividing the radius of curvature R$_4$ of the rear surface of the intermediate negative lens II by the radius of curvature R$_1$ of the front surface of the front lens I is between the values 0.900 and 0.980, so that $$0.900 < (R_4 : R_1) < 0.980$$

(C$_3$) The value of the negative radius R$_3$ of the front surface of the intermediate lens II is between 70% and 100% of the equivalent focal length ($f$) of the entire objective, so that $$0.70f < R_3 < 1.00f$$

(C$_4$) The value of the quotient obtained by dividing the radius of curvature R$_3$ of the front surface of the intermediate lens II by the radius of curvature R$_4$ of the rear surface of this lens is between −1.50 and −3.00 so that $$-1.50 < R_3 : R_4 < -3.00$$

(D$_1$) The distance (V$_6$M$_4$) of the center of curvature M$_4$ of the radius of curvature R$_4$ of the rear surface of the intermediate lens II from the vertex (V$_6$) of the adjoining surfaces (R$_6$,R'$_6$) is between 21.5% and 29.5% of the equivalent focal length ($f$) of the entire objective so that $$0.215f < V_6M_4 < 0.295f$$

(D$_2$) The radius of curvature R$_6$ of the adjoining surfaces of the lenses of the rear component III is between 45% and 65% of the equivalent focal length ($f$) of the entire objective, so that $$0.45F < R_6 < 0.65f$$

(D$_3$) The radius of curvature R$_4$ of the rear surface of the intermediate lens II and the radius of curvature R$_6$ of the adjoining surfaces of the doublet III together form a pair of surfaces of meniscus configuration whose Gardner's factor ($\sigma_{4,6}$) which is between 4.875 and 6.725, so that $$4.875 < \sigma_{4,6} < 6.725$$

(D$_4$) The quotient resulting from dividing the radius of curvature R$_6$ of the adjoining lens surfaces of the doublet III by the radius of curvature R$_1$ of the front surface of the front lens I is between 1.215 and 1.465, so that $$1.215 < (R_6 : R_1) < 1.465$$

In addition to the above specific requirements, the objective of the invention fulfills the following subsidiary requirements:

(E) The pair of surfaces which have the radii of curvatures R$_4$ and R$_6$, referred to above in connection with requirement D$_3$, while capable of having a Gardner's factor ($\sigma_{4,6}$) of up to 6.725, preferably has a Gardner's factor ($\sigma_{4,6}$) which is less than 6.425, so that $$\sigma_{4,6} < 6.425$$

(F) The Gardner's index ($\sigma_{III}$) of the front and rear exterior surfaces of the doublet III, which respectively have the radii of curvature R$_5$ and R$_7$, is between −0.575 and −0.775, so that $$-0.575 < \sigma_{III} < -0.775$$

The above combination of features thus relates to the specific curvatures of the dioptrically-active surfaces of the three objective components which are spaced from each other in the air and which have the basic, individual focal lengths of their refractive powers and which are designed in the above-described manner with respect to the full opening of the entrance pupil and thus with respect to the cross-section of the bundle of light rays which pass through the objective, while at the same time determining also the refractive powers $\varphi_2$ and $\varphi_N$ of the outer converging components, the latter refractive powers being particularly important for avoiding astigmatism.

It is apparent from the above radii of curvature that with the objective of the invention, in addition to influencing the spherical aberrations and fulfilling the sine requirements, there is also maintenance of an extremely small asymmetrical error and thus the coma error of the wide open bundle of light rays is at the same time eliminated. The advantages achieved with the invention are not assured, however, if the limits of the ranges presented above are exceeded either with factors below these ranges or with factors above these ranges.

In the course of carrying out the objectives of the invention in a practical manner, it has proved to be of considerable advantage to maintain the curvature ($\sigma_{4,6}$) of both of the lens surfaces which are concave toward the rear, namely those surfaces which have the radii of curvature R$_4$ and R$_6$ below 6.425, if possible, as was indicated above with respect to requirement E.

Also, in the course of development of the objective of the invention it has proved to be particularly advantageous to provide the requirement F set forth above, according to which the Gardner's factor $\sigma_{III}$ of the rear doublet III is greater than −0.575, but less than −0.775.

With respect to the symbols used above, as well as in the examples which follow, the symbol $f^{**}$ signifies the above-mentioned ratio of the basic focal length $f^*$ of each of the components (I, II, III) of the objective with respect to the diameter (P) of the fully open entrance pupil of the entire objective.

The basic focal length $f^*$ is equal to the reciprocal value of the total of the refractive powers of the individual surfaces, where the refractive power of a surface in a known way is $$\varphi = \frac{n' - n}{R}$$

The diameter (P) of the entrance pupil of the objective is equal to the quotient ($f:z$) resulting from the division of the equivalent focal length ($f$) of the entire objective by the aperture number ($z$) of the largest aperture of the objective (for example 2.8). Thus, set forth mathematically:

$$f_I^* = \frac{1}{(\varphi_1 + \varphi_2)} \text{ and } f_I^{**} = \frac{f_I^*}{P}, \text{ where } P = \frac{f}{z}$$

The Gardner's factor ($\sigma$) is defined in "Application of the Algebraic Aberration Equations to Optical Design," by I. C. Gardner, pp. 82/83.

The three requirements A$_1$, A$_2$, A$_3$ indicated above represent the measurement of the entrance pupil with reference to the basic focal length of the three components of the objective of the invention, while the factors B$_1$ and B$_2$ indicate the paraxial refractive powers of the surfaces of the outer components which are so important with respect to astigmatism, and the factors C$_1$ and C$_2$ represent the outer surface curvatures of the front pair of air-separated lenses. The requirements C$_3$ and C$_4$ represent the configuration of the surfaces of the intermediate negative lens II. The requirement D represents the form of the adjoining surfaces of the lenses of the doublet III with reference to the strongly diverging rear surface of the intermediate lens II.

EXAMPLE I
$f=100.0$ mm.   Included Angle=56°   Relative Aperture=1:2.8

| | | | | |
|---|---|---|---|---|
| $R_1=+39.266$ | $d_1=10.62$ | $n_1=1.7130$ | $\nu_1=53.89$ | $\varphi_1=+1.81582\cdot 1/f$ |
| $R_2=+283.685$ | $a_1=5.69$ | | | $\varphi_2=-0.25133\cdot 1/f$ |
| $R_3=-99.940$ | $d_2=2.53$ | $n_2=1.6236$ | $\nu_2=36.75$ | $\varphi_3=-0.62401\cdot 1/f$ |
| $R_4=+35.715$ | $a_2=9.63$ | | | $\varphi_4=-1.74616\cdot 1/f$ |
| $R_5=+263.753$ | $d_3=2.39$ | $n_3=1.6261$ | $\nu_3=39.10$ | $\varphi_5=+0.23736\cdot 1/f$ |
| $R_6=R_6'=50.234$ | $d_4=9.49$ | $n_4=1.7550$ | $\nu_4=53.28$ | $\varphi_6=+0.25660\cdot 1/f$ |
| $R_7=-69.533$ | | | | $\varphi_7=+1.08576\cdot 1/f$ |

Fulfilling of requirements:

$(\sigma_I=+1.321)>+1.0$     (a)
$-0.175<(\sigma_{II}=-0.473)<-0.575$     (b)
$(a_2=9.63)>(a_1=5.69)$     (c)
$(R_1=0.3927f)>(R_4=0.3571f)<(R_6=0.5023f)$     (d)
$+1.625<(f_I^{**}=+1.7895)<+1.875$     ($A_1$)
$-1.085<(f_{II}^{**}=-1.1813)<-1.225$     ($A_2$)
$+1.625<(f_{III}^{**}=+1.7733)<+2.055$     ($A_3$)
$-0.060\Phi<(\varphi_2=-0.2513\Phi)<-0.300\Phi$     ($B_1$)
$+0.130\Phi<(\varphi_N=+0.2565\Phi)<+0.275\Phi$     ($B_2$)
$0.725f<((R_1+R_4)=0.7498f)<0.925f$     ($C_1$)
$0.900<((R_4:R_1)=0.9096)<0.980$     ($C_2$)
$0.70f<(-R_3=0.9994f)<1.000f$     ($C_3$)
$-1.50<((R_3:R_4)=-2.7983)<-3.00$     ($C_4$)
$0.215f<(V_6M_4=0.2370f)<0.295f$     ($D_1$)
$0.45f<(R_6=0.5023f)<0.65f$     ($D_2$)
$4.875<(\sigma_{4,6}=5.9198)<6.725$     ($D_3$)
$1.215<(R_6:R_1)=1.2793<1.465$     ($D_4$)
$(\sigma_{4,6}=5.9198)<6.425$     (E)
$-0.575<(\sigma_{III}=-0.5827)<-0.775$     (F)

EXAMPLE II
$f=100.0$ mm.   Included Angle=56°   Relative Aperture=1:2.8

| | | | | |
|---|---|---|---|---|
| $R_1=+42.027$ | $d_1=10.32$ | $n_1=1.7292$ | $\nu_1=54.82$ | $\varphi_1=+1.73498\cdot 1/f$ |
| $R_2=453.987$ | $a_1=6.31$ | | | $\varphi_2=-0.16061\cdot 1/f$ |
| $R_3=-89.403$ | $d_2=2.55$ | $n_2=1.6364$ | $\nu_2=35.35$ | $\varphi_3=-0.71179\cdot 1/f$ |
| $R_4=+38.715$ | $a_2=9.45$ | | | $\varphi_4=-1.64370\cdot 1/f$ |
| $R_5=+242.642$ | $d_3=2.35$ | $n_3=1.6254$ | $\nu_3=35.57$ | $\varphi_5=+0.25773\cdot 1/f$ |
| $R_6=R_6'=+57.210$ | $d_4=9.28$ | $n_4=1.7170$ | $\nu_4=47.90$ | $\varphi_6=+0.16018\cdot 1/f$ |
| $R_7=-62.317$ | | | | $\varphi_7=+1.15057\cdot 1/f$ |

Fulfilling of requirements:

$(\sigma_I=+1.204)>+1.0$     (a)
$-0.175<(\sigma_{II}=-0.3956)<-0.575$     (b)
$(a_2=9.45)>(a_1=6.31)$     (c)
$(R_1=0.4203f)>(R_4=0.3871f)<(R_6=0.5721f)$     (d)
$+1.625<(f_I^{**}=+1.7786)<+1.875$     ($A_1$)
$-1.085<(f_{II}^{**}=-1.1888)<-1.225$     ($A_2$)
$+1.625<(f_{III}^{**}=+1.7854)<+2.055$     ($A_3$)
$-0.060\Phi<(\varphi_2=-0.1606\Phi)<-0.300\Phi$     ($B_1$)
$+0.130\Phi<(\varphi_N=+0.1602\Phi)<+0.275\Phi$     ($B_2$)
$0.725f<((R_1+R_4)=0.8074f)<0.925f$     ($C_1$)
$0.900<((R_4:R_1)=0.9212)<0.980$     ($C_2$)
$0.70f<(-R_3=0.8940f)<1.00f$     ($C_3$)
$-1.50<((R_3:R_4)=-2.3093)<-3.00$     ($C_4$)
$0.215f<(V_6M_4=0.2692f)<0.295f$     ($D_1$)
$0.45f<(R_6=0.55721f)<0.65f$     ($D_2$)
$4.875<(\sigma_{4,6}=5.1865)<6.725$     ($D_3$)
$1.215<((R_6:R_1)=1.3613)<1.465$     ($D_4$)
$(\sigma_{4,6}=5.1865)<6.425$     (E)
$-0.575<(\sigma_{III}=-0.5913)<-0.775$     (F)

EXAMPLE III
$f=100.0$ mm.   Included Angle=56°   Relative Aperture=1:2.8

| | | | | |
|---|---|---|---|---|
| $R_1=+40.964$ | $d_1=10.00$ | $n_1=1.7130$ | $\nu=53.89$ | $\varphi_1=+1.74055\cdot 1/f$ |
| $R_2=+458.307$ | $a_1=5.89$ | | | $\varphi_2=-0.15557\cdot 1/f$ |
| $R_3=-92.692$ | $d_2=2.54$ | $n_2=1.6200$ | $\nu=36.34$ | $\varphi_3=-0.66892\cdot 1/f$ |
| $R_4=+37.446$ | $a_2=9.65$ | | | $\varphi_4=-1.65583\cdot 1/f$ |
| $R_5=+376.691$ | $d_3=2.40$ | $n_3=1.6208$ | $\nu=31.10$ | $\varphi_5=+0.16480\cdot 1/f$ |
| $R_6=R_6'=+54.271$ | $d_4=9.47$ | $n_4=1.7440$ | $\nu=44.90$ | $\varphi_6=+0.22703\cdot 1/f$ |
| $R_7=-65.139$ | | | | $\varphi_7=+1.14217\cdot 1/f$ |

Fulfilling of requirements:

$(\sigma_I=+1.1963)>+1.0$     (a)
$-0.175<(\sigma_{II}=-0.4245)<-0.575$     (b)
$(a_2=9.65)>(a_1=5.89)$     (c)
$(R_1=0.4096f)>(R_4=0.3745f)<(R_6=0.5427f)$     (d)
$+1.625<(f_I^{**}=+1.7666)<+1.875$     ($A_1$)
$-1.085<(f_{II}^{**}=-1.2045)<-1.225$     ($A_2$)
$+1.625<(f_{III}^{**}=+1.8254)<+2.055$     ($A_3$)
$-0.060\Phi<(\varphi_2=-0.1556\Phi)<-0.300\Phi$     ($B_1$)
$+0.130\Phi<(\varphi_N=+0.2270\Phi)<+0.275\Phi$     ($B_2$)
$0.725f<((R_1+R_4)=0.7841f)<0.925f$     ($C_1$)
$0.900<((R_4:R_1)=0.9141)<0.980$     ($C_2$)
$0.70f<(-R_3=0.9269f)<1.00f$     ($C_3$)
$-1.50<((R_3:R_4)=-2.4753)<-3.00$     ($C_4$)
$0.215f<(V_6M_4=0.2540f)<0.295f$     ($D_1$)
$0.45f<(R_6=0.5427f)<0.65f$     ($D_2$)
$4.875<(\sigma_{4,6}=5.4512)<6.725$     ($D_3$)
$1.215<((R_6:R_1)=1.3248)<1.465$     ($D_4$)
$(\sigma_{4,6}=5.4512)<6.425$     (E)
$-0.575<(\sigma_{III}=-0.7051)<-0.775$     (F)

EXAMPLE IV
$f=100.0$ mm.   Included Angle=53°   Relative Aperture=1:2.8

| | | | | |
|---|---|---|---|---|
| $R_1=+42.254$ | $d_1=9.748$ | $n_1=1.7200$ | $\nu_1=50.31$ | $\varphi_1=+1.70398\cdot 1/f$ |
| $R_2=+580.113$ | $a_1=6.938$ | | | $\varphi_2=-0.12411\cdot 1/f$ |
| $R_3=-84.925$ | $d_2=2.567$ | $n_2=1.6502$ | $\nu_2=33.69$ | $\varphi_3=-0.76558\cdot 1/f$ |
| $R_4=+38.750$ | $a_2=9.506$ | | | $\varphi_4=-1.67786\cdot 1/f$ |
| $R_5=+364.886$ | $d_3=2.463$ | $n_3=1.5955$ | $\nu_3=39.20$ | $\varphi_5=+0.16320\cdot 1/f$ |
| $R_6=R_6'=+53.144$ | $d_4=9.644$ | $n_3=1.7200$ | $\nu_4=50.31$ | $\varphi_6=+0.23425\cdot 1/f$ |
| $R_7=-58.490$ | | | | $\varphi_7=+1.23098\cdot 1/f$ |

Fulfilling of requirements:

$(\sigma_I=+1.1571)>+1.00$     (a)
$-0.175<(\sigma_{II}=-0.3734)<0.575$     (b)
$(a_2=9.506)>(a_1=6.938)$     (c)
$(R_1=0.4225f)>(R_4=0.3875f)<(R_6=0.5314f)$     (d)
$+1.625<(f_I^{**}=+1.7723)<+1.875$     ($A_1$)
$-1.085<(f_{II}^{**}=-1.1459)<-1.225$     ($A_2$)
$+1.625<(f_{III}^{**}=+1.7197)<+2.055$     ($A_3$)
$-0.060\Phi<(\varphi_2=-0.1241\Phi)<-0.300\Phi$     ($B_1$)
$+0.130\Phi<(\varphi_N=+0.2343\Phi)<+0.275\Phi$     ($B_2$)
$0.725f<((R_1+R_4)=0.810f)<0.925f$     ($C_1$)
$0.900<((R_4:R_1)=0.9171)<0.980$     ($C_2$)
$0.70f<(-R_3=0.8493f)<1.00f$     ($C_3$)
$-1.50<((R_3:R_4)=-2.1916)<-3.00$     ($C_4$)
$0.215f<(V_6M_4=0.2678f)<0.295f$     ($D_1$)
$0.45f<(R_6=0.5314f)<0.65f$     ($D_2$)
$4.875<(\sigma_{4,6}=6.3842)<6.725$     ($D_3$)
$1.215<((R_6:R_1)=1.2577)<1.465$     ($D_4$)
$(\sigma_{4,6}=6.3842)<6.425$     (E)
$-0.575<(\sigma_{III}=-0.7237)<-0.775$     (F)

3,420,602

EXAMPLE V $f=100.0$ mm. Included Angle=56° Relative Aperture=1:2.8

| | | | | |
|---|---|---|---|---|
| $R_1=+42.754$ | $d_1=8.88$ | $n_1=1.7335$ | $\nu_1=51.04$ | $\varphi_1=+1.71563\cdot 1/f$ |
| $R_2$ +624.880 | $a_1=7.75$ | | | $\varphi_2$ −0.11738·1/f |
| $R_3=-77.527$ | $d_2=2.20$ | $n_2=1.6727$ | $\nu_2=32.23$ | $\varphi_3=-0.86770\cdot 1/f$ |
| $R_4=+39.808$ | $a_2=10.20$ | | | $\varphi_4=-1.68986\cdot 1/f$ |
| $R_5=+355.317$ | $d_3=2.03$ | $n_3=1.6056$ | $\nu_3=37.95$ | $\varphi_5=+0.17045\cdot 1/f$ |
| $R_6=R'_6=+56.808$ | $d_4=8.20$ | $n_4=1.7170$ | $\nu_4=47.90$ | $\varphi_6=+0.19601\cdot 1/f$ |
| $R_7=-54.268$ | | | | $\varphi_7=+1.32122\cdot 1/f$ |

Fulfilling of requirements:

$(\sigma_I=+1.1469)>+1.00$      (a)
$-0.175<(\sigma_{II}=-0.3215)<-0.575$      (b)
$(a_2=10.20)>(a_1=7.75)$      (c)
$(R_1=0.4275f)>(R_4=0.3981f)<(R_6=0.5681f)$      (d)
$+1.625<(f_I^{**}=+1.7520)<+1.875$      (A₁)
$-1.085<(f_{II}^{**}=-1.0948)<-1.225$      (A₂)
$+1.625<(f_{III}^{**}=+1.6592)<+2.055$      (A₃)
$-0.060\Phi<(\varphi_2=-0.1174\Phi)<-0.300\Phi$      (B₁)
$+0.130\Phi<(\varphi_N=+0.1960\Phi)<+0.275\Phi$      (B₂)
$0.725f<((R_1+R_4)=0.8256f)<0.925f$      (C₁)
$0.900<((R_4:R_1)=0.9311)<0.980$      (C₂)
$0.70f<(-R_3=0.7753f)<1.00f$      (C₃)
$-1.50<((R_3:R_4)=-1.9475)<-3.00$      (C₄)
$0.215f<(V_6M_4=0.2758f)<0.295f$      (D₁)
$0.45f<(R_6=0.5681f)<0.65f$      (D₂)
$4.875<(\sigma_{4,6}=5.6833)<5.725$      (D₃)
$1.215<((R_6:R_1)=1.3287)<1.465$      (D₄)
$(\sigma_{4,6}=5.6833)<6.425$      (E)
$-0.575<(\sigma_{III}=-0.7350)<-0.775$      (F)

EXAMPLE VI $f=100.0$ mm. Included Angle=53° Relative Aperture=1:2.8

| | | | | |
|---|---|---|---|---|
| $R_1=+43.466$ | $d_1=8.91$ | $n_1=1.7335$ | $\nu_1=51.04$ | $\varphi_1=+1.68753\cdot 1/f$ |
| $R_2=+624.854$ | $a_1=8.16$ | | | $\varphi_2=-0.11739\cdot 1/f$ |
| $R_3=-75.987$ | $d_2=2.06$ | $n_2=1.6547$ | $\nu_2=32.87$ | $\varphi_3=-0.86163\cdot 1/f$ |
| $R_4=+40.698$ | $a_2=9.95$ | | | $\varphi_4=-1.60875\cdot 1/f$ |
| $R_5=+393.799$ | $d_3=2.67$ | $n_3=1.6547$ | $\nu_3=32.87$ | $\varphi_5=+0.16626\cdot 1/f$ |
| $R_6=R'_6=56.234$ | $d_4=8.00$ | $n_4=1.7440$ | $\nu_4=44.90$ | $\varphi_6=+0.15875\cdot 1/f$ |
| $R_7=-56.234$ | | | | $\varphi_7=+1.32304\cdot 1/f$ |

Fulfilling of requirements:

$(\sigma_I=1.1495)>+1.00$      (a)
$-0.175<(\sigma_{II}=-0.3024)<-0.575$      (b)
$(a_2=9.95)>(a_1=8.16)$      (c)
$(R_1=0.4347f)>(R_4=0.4070f)<(R_6=0.5623f)$      (d)
$+1.625<(f_I^{**}=+1.7833)<+1.875$      (A₁)
$-1.085<(f_{II}^{**}=-1.1334)<-1.225$      (A₂)
$+1.625<(f_{III}^{**}=+1.6990)<+2.055$      (A₃)
$-0.060\Phi<(\varphi_2=-0.1174\Phi)<-0.300\Phi$      (B₁)
$+0.130\Phi<(\varphi_N=+0.1587\Phi)<+0.275\Phi$      (B₂)
$0.725f<((R_1+R_4)=0.8416f)<0.925f$      (C₁)
$0.900<((R_4:R_1)=0.9363)<0.980$      (C₂)
$0.70f<(-R_3=0.7599f)<1.00f$      (C₃)
$-1.50<((R_3:R_4)=-1.8671)<-3.00$      (C₄)
$0.215f<(V_6M_4=0.2808f)<0.295f$      (D₁)
$0.45f<(R_6=0.5623f)<0.65f$      (D₂)
$4.875<(\sigma_{4,6}=6.2392)<6.725$      (D₃)
$1.215<((R_6:R_1)=1.2937)<1.465$      (D₄)
$(\sigma_{4,6}=6.2392)<6.425$      (E)
$-0.575<(\sigma_{III}=-0.7501)<-0.775$      (F)

EXAMPLE VII $f=100.0$ mm. Included Angle=53° Related Aperture=1:2.8

| | | | | |
|---|---|---|---|---|
| $R_1=+42.348$ | $d_1=8.48$ | $n_1=1.7335$ | $\nu_1=51.04$ | $\varphi_1=+1.73208\cdot 1/f$ |
| $R_2=+859.654$ | $a_1=7.25$ | | | $\varphi_2=-0.08532\cdot 1/f$ |
| $R_3=-72.448$ | $d_2=1.97$ | $n_2=1.6547$ | $\nu_2=32.87$ | $\varphi_3=-0.90372\cdot 1/f$ |
| $R_4=+39.706$ | $a_2=8.95$ | | | $\varphi_4=-1.64894\cdot 1/f$ |
| $R_5=\infty$ | $d_3=2.55$ | $n_3=1.6204$ | $\nu_3=37.97$ | $\varphi_5=0$ |
| $R_6=R'_6=+53.647$ | $d_4=7.61$ | $n_4=1.7440$ | $\nu_4=44.90$ | $\varphi_6=+0.23030\cdot 1/f$ |
| $R_7=-52.794$ | | | | $\varphi_7=+1.40925\cdot 1/f$ |

Fulfilling of requirements:

$(\sigma_I=1.1036)>+1.00$      (a)
$-0.175<(\sigma_{II}=-0.2694)<-0.575$      (b)
$(a_2=8.95)>(a_1=7.25)$      (c)
$(R_1=0.4235f)>(R_4=0.3971f)<(R_6=0.5365f)$      (d)
$+1.625<(f_I^{**}=+1.7003)<+1.875$      (A₁)
$-1.085<(f_{II}^{**}=-1.0969)<-1.225$      (A₂)
$+1.625<(f_{III}^{**}=+1.9869)<+2.055$      (A₃)
$-0.060\Phi<(\varphi_2=-0.0853\Phi)<+0.300\Phi$      (B₁)
$+0.130\Phi<(\varphi_N=+0.2303\Phi)<+0.275\Phi$      (B₂)
$0.725f<((R_1+R_4)=0.8205f)<0.925f$      (C₁)
$0.900<((R_4:R_1)=0.9376)<0.980$      (C₂)
$0.70f<(-R_3=0.7245f)<1.00f$      (C₃)
$-1.50<((R_3:R_4)=1.8246)<3.00$      (C₄)
$0.215f<(V_6M_4=0.2821f)<0.295f$      (D₁)
$0.45f<(R_6=0.5365f)<0.65f$      (D₂)
$4.875<(\sigma_{4,6}=6.6963)<6.725$      (D₃)
$1.215<((R_6:R_1)=1.2668<1.465$      (D₄)
$(\sigma_{4,6}=6.6963$ which is $>6.425$      (E)
$-0.575<(\sigma_{III}=-1.00)$ which is $>-0.775$      (F)

In this example, requirements (E) and (F) are not fulfilled.

What is claimed is:

1. A photographic objective of relatively wide aperture and having an included angle of greater than 50°, said objective being in the form of a triplet having one cemented component, and said objective being spherically and chromatically corrected as well as corrected for astigmatism, curvature of field, coma, and distortion, and said objective including from front to rear in the direction in which light enters said objective from the side of the longer conjugate, a front lens I, an intermediate, non-symmetrical diverging lens II spaced rearwardly from said front lens and situated in the region of a diaphragm of the objective, said front and intermediate lenses defining between themselves an air space functioning as a diverging air lens, and a rear lens component III situated rearwardly of said intermediate lens and having the form of a converging doublet, said doublet being constituted by a pair of lenses having opposite signs of power and adjoining surfaces which act in a converging manner and which have a rearwardly directed concave curvature, said objective fulfilling the following general requirements:

(a) said front lens I is a converging lens of meniscus configuration,
(b) said intermediate negative lens II has a Gardner's shape factor of between −0.175 and −0.575,
(c) the distance along the principal axis between the doublet and said intermediate lens is greater than the distance between said intermediate lens and front lens, and
(d) the radius of curvature of the rear surface of said intermediate lens being smaller than the radius of curvature of the front surface of said front lens and also smaller than the radius of curvature of the adjoining surfaces of the doublet lenses, said objective also fulfilling the following specific requirements:

(A₁) the ratio $(f_I^{**})$ of the focal length $(f_I^*)$ of the converging front meniscus lens I to the diameter (P) of the fully open entrance pupil of the entire objective being between the values +1.625 and +1.875, said focal length ($f_I^*$) of said front lens I being equal to the reciprocal of the sum of the refractive powers of the front and rear surfaces of said front lens I, ($A_2$) the corresponding ratio ($f_{II}^{}$) of the diverging intermediate lens (II) being between the values −1.085 and −1.225, ($A_3$) the corresponding ratio ($f_{III}^{}$) of the doublet III being between the values +1.625 and +2.055, ($B_1$) the value of the negative refractive power ($\varphi_2$) of the rear surface of said front lens I being between 6% and 30% of the equivalent refractive power ($\Phi$) of the entire objective, ($B_2$) the value of the positive refractive power ($\varphi_N$) of the adjoining surfaces of the lenses of said converging doublet III being between 13% and 27.5% of the equivalent refractive power ($\Phi$) of the entire objective, ($C_1$) the value of the sum of the radius of curvature ($R_1$) of the front surface of the front lens I and the radius of curvature ($R_4$) of the rear surface of the intermediate lens II being between 72.5% and 92.5% of the equivalent focal length ($f$) of the entire objective, ($C_2$) the value of the quotient of the radius of curvature ($R_4$) of the rear surface of the intermediate lens divided by the radius of curvature ($R_1$) of the front surface of the front lens I being between 0.900 and 0.980, ($C_3$) the value of the negative radius of the curvature ($R_3$) of the front surface of the intermediate lens II being between 70% and 100% of the equivalent focal length ($f$) of the entire objective, ($C_4$) the value of the quotient of the radius of the curvature ($R_3$) of the front surface of the intermediate lens II divided by the radius of the curvature ($R_4$) of the rear surface thereof being between −1.50 and −3.00, ($D_1$) the distance ($V_6M_4$) along the principal axis between the center of the curvature ($M_4$) of the rear surface of the intermediate lens II and the vertex ($V_6$) of the adjoining surfaces of the lenses of the doublet being between 21.5% and 29.5% of the equivalent focal length ($f$) of the entire objective, ($D_2$) the value of the radius of the curvature ($R_6$) of the adjoining lens surface of the doublet III being between 45% and 65% of the equivalent focal length ($f$) of the entire objective, ($D_3$) the radius of curvature ($R_4$) of the rear surface of the intermediate lens II and the radius of the curvature ($R_6$) of the adjoining lens surface of the doublet III cooperating together to form a pair of surfaces of meniscus configuration whose Gardner's shape-factor ($\sigma_{4,6}$) is between the values 4.875 and 6.725, and ($D_4$) the quotient of the radius of the curvature ($R_6$) of the adjoining lens surfaces of the doublet III divided by the radius of the curvature ($R_1$) of the front surface of the front lens I being between the values 1.215 and 1.465.

2. An objective as recited in claim 1, and wherein said objective fulfills the following additional requirement:

(E) the Gardner's shape-factor ($\sigma_{4,6}$) of the meniscus-shaped pair of surfaces at the rear of the intermediate lens II and at the adjoining lens surfaces of the doublet III, respectively, being less than 6.425.

3. An objective as recited in claim 1, and wherein said objective fulfills the following additional requirement:

(F) the Gardner's shape-factor ($\sigma_{III}$) of the front and rear outer surfaces of said doublet III being between the values −0.575 and −0.775.

4. An objective as recited in claim 1, and wherein said objective has, with respect to a focal length of 1.0, the following data where the symbols identified at the heading have the numerical values:

| Radii, R | Lens Thickness, d | Distance Between Lenses, a | Refractive Index, $n_d$ | Nu-Value, $\nu$ |
|---|---|---|---|---|
| $R_1$=+0.393 | $d_1$=0.110 |  | $n_1$=1.713 | $\nu_1$=53.9 |
| $R_2$=+2.837 |  | $a_1$=0.057 |  |  |
| $R_3$=−0.999 | $d_2$=0.025 |  | $n_2$=1.624 | $\nu_2$=36.8 |
| $R_4$=+0.357 |  | $a_2$=0.096 |  |  |
| $R_5$=+2.638 | $d_3$=0.024 |  | $n_3$=1.626 | $\nu_3$=39.1 |
| $R_6$=+0.502 | $d_4$=0.095 |  | $n_4$=1.755 | $\nu_4$=53.3 |
| $R_7$=−0.695 |  |  |  |  |

5. An objective as recited in claim 1, and wherein said objective has, with respect to a focal length of 1.0, the following data where the symbols identified at the heading have the numerical values:

| Radii, R | Lens Thickness, d | Distance Between Lenses, a | Refractive Index, $n_d$ | Nu-Value, $\nu$ |
|---|---|---|---|---|
| $R_1$=+0.420 | $d_1$=0.103 |  | $n_1$=1.729 | $\nu_1$=54.8 |
| $R_2$=+4.540 |  | $a_1$=0.063 |  |  |
| $R_3$=−0.894 | $d_2$=0.026 |  | $n_2$=1.636 | $\nu_2$=35.4 |
| $R_4$=+0.387 |  | $a_2$=0.94 |  |  |
| $R_5$=+2.426 | $d_3$=0.024 |  | $n_3$=1.625 | $\nu_3$=35.6 |
| $R_6$=+0.572 | $d_4$=0.093 |  | $n_4$=1.717 | $\nu_4$=47.9 |
| $R_7$=−0.623 |  |  |  |  |

6. An objective as recited in claim 1, and wherein said objective has, with respect to a focal length of 1.0, the following data where the symbols identified at the heading have the numerical values:

| Radii, R | Lens Thickness, d | Distance Between Lenses, a | Refractive Index, $n_d$ | Nu-Value, $\nu$ |
|---|---|---|---|---|
| $R_1$=+0.410 | $d_1$=0.100 |  | $n_1$=1.713 | $\nu_1$=53.9 |
| $R_2$=+4.583 |  | $a_1$=0.059 |  |  |
| $R_3$=−0.927 | $d_2$=0.025 |  | $n_2$=1.620 | $\nu_2$=36.3 |
| $R_4$=+0.374 |  | $a_2$=0.096 |  |  |
| $R_5$=+3.767 | $d_3$=0.024 |  | $n_3$=1.621 | $\nu_3$=31.1 |
| $R_6$=+0.543 | $d_4$=0.095 |  | $n_4$=1.744 | $\nu_4$=44.9 |
| $R_7$=−0.651 |  |  |  |  |

7. An objective as recited in claim 1, and wherein said objective has, with respect to a focal length of 1.0, the following data where the symbols identified at the heading have the numerical values:

| Radii, R | Lens Thickness, d | Distance Between Lenses, a | Refractive Index, $n_d$ | Nu-Value, $\nu$ |
|---|---|---|---|---|
| $R_1$=+0.422 | $d_1$=0.097 |  | $n_1$=1.720 | $\nu_1$=50.3 |
| $R_2$=+5.801 |  | $a_1$=0.069 |  |  |
| $R_3$=−0.849 | $d_2$=0.026 |  | $n_2$=1.650 | $\nu_2$=33.7 |
| $R_4$=+0.388 |  | $a_2$=0.095 |  |  |
| $R_5$=+3.649 | $d_3$=0.025 |  | $n_3$=1.596 | $\nu_3$=39.2 |
| $R_6$=+0.531 | $d_4$=0.096 |  | $n_4$=1.720 | $\nu_4$=50.3 |
| $R_7$=−0.585 |  |  |  |  |

8. An objective as recited in claim 1, and wherein said objective has, with respect to a focal length of 1.0, the following data where the symbols identified at the heading have the numerical values:

| Radii, R | Lens Thickness, d | Distance Between Lenses, a | Refractive Index, $n_d$ | Nu-Value, $\nu$ |
|---|---|---|---|---|
| $R_1=+0.428$ | $d_1=0.089$ | | $n_1=1.734$ | $\nu_1=51.0$ |
| $R_2=+6.249$ | | $a_1=0.078$ | | |
| $R_3=-0.775$ | $d_2=0.022$ | | $n_2=1.673$ | $\nu_2=32.2$ |
| $R_4=+0.398$ | | $a_2=0.102$ | | |
| $R_5=+3.553$ | $d_3=0.020$ | | $n_3=1.606$ | $\nu_3=38.0$ |
| $R_6=+0.568$ | $d_4=0.082$ | | $n_4=1.717$ | $\nu_4=47.9$ |
| $R_7=-0.543$ | | | | |

9. An objective as recited in claim 1, and wherein said objective has, with respect to a focal length of 1.0, the following data where the symbols identified at the heading have the numerical values:

| Radii, R | Lens Thickness, d | Distance Between Lenses, a | Refractive Index, $n_d$ | Nu-Value, $\nu$ |
|---|---|---|---|---|
| $R_1=+0.435$ | $d_1=0.089$ | | $n_1=1.734$ | $\nu_1=51.0$ |
| $R_2=+6.248$ | | $a_1=0.082$ | | |
| $R_3=-0.760$ | $d_2=0.021$ | | $n_2=1.655$ | $\nu_2=32.9$ |
| $R_4=+0.407$ | | $a_2=0.100$ | | |
| $R_5=+3.938$ | $d_3=0.027$ | | $n_3=1.655$ | $\nu_3=32.9$ |
| $R_6=+0.562$ | $d_4=0.080$ | | $n_4=1.744$ | $\nu_4=44.9$ |
| $R_7=-0.562$ | | | | |

10. An objective as recited in claim 1, and wherein said objective has, with respect to a focal length of 1.0, the following data where the symbols identified at the heading have the numerical values:

| Radii, R | Lens Thickness, d | Distance Between Lenses, a | Refractive Index, $n_d$ | Nu-Value, $\nu$ |
|---|---|---|---|---|
| $R_1=+0.423$ | $d_1=0.085$ | | $n_1=1.733$ | $\nu_1=51.0$ |
| $R_2=+8.957$ | | $a_1=0.072$ | | |
| $R_3=-0.724$ | $d_2=0.020$ | | $n_2=1.655$ | $\nu_2=32.9$ |
| $R_4=+0.397$ | | $a_2=0.0895$ | | |
| $R_5=\pm\infty$ | $d_3=0.026$ | | $n_3=1.620$ | $\nu_3=38.0$ |
| $R_6=+0.536$ | $d_4=0.076$ | | $n_4=1.744$ | $\nu_4=44.9$ |
| $R_7=-0.528$ | | | | |

References Cited

UNITED STATES PATENTS 2,724,992  11/1955  Brendel et al. _____ 350—227
2,732,762  1/1956   Lange et al. _____ 350—227
2,764,063  9/1956   Lange _____ 350—227

FOREIGN PATENTS 855,706  12/1960  Great Britain.

DAVID J. STERN, *Primary Examiner.*
RONALD J. STERN, *Assistant Examiner.*